(12) United States Patent
Primiero

(10) Patent No.: US 12,436,310 B2
(45) Date of Patent: Oct. 7, 2025

(54) RESERVOIR PROPERTIES DERIVED USING ULTRA-DEEP RESISTIVITY INVERSION DATA

(71) Applicant: Halliburton Energy Services, Inc., Houston, TX (US)

(72) Inventor: Paolo Primiero, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 445 days.

(21) Appl. No.: 17/866,340

(22) Filed: Jul. 15, 2022

(65) Prior Publication Data

US 2024/0019599 A1     Jan. 18, 2024

(51) Int. Cl.
*G01V 3/20* (2006.01)
*E21B 7/04* (2006.01)
(Continued)

(52) U.S. Cl.
CPC ............... *G01V 3/20* (2013.01); *E21B 7/04* (2013.01); *E21B 44/02* (2013.01); *E21B 49/00* (2013.01); *E21B 2200/20* (2020.05)

(58) Field of Classification Search
CPC .. G01V 3/20; E21B 7/04; E21B 44/02; E21B 49/00; E21B 2200/20
See application file for complete search history.

(56) References Cited

U.S. PATENT DOCUMENTS

| 9,453,929 | B2 | 9/2016 | Schmedes et al. | |
| 9,939,548 | B2 * | 4/2018 | Burmester | ............. G01V 11/00 |

(Continued)

FOREIGN PATENT DOCUMENTS

| CN | 109891047 A | * | 6/2019 | ............. E21B 34/06 |
| CN | 113176614 A | * | 7/2021 | ............... G01V 1/50 |

(Continued)

OTHER PUBLICATIONS

Carcione, et al.; "Cross-property relations between electrical conductivity and the seismic velocity of rocks"; Geophysics, vol. 72, No. 5; Sep.-Oct. 2007; 12 pgs.

(Continued)

*Primary Examiner* — Lisa M Caputo
*Assistant Examiner* — Nyla Gavia
(74) *Attorney, Agent, or Firm* — Benjamin Ford; Parker Justiss, P.C.

(57) ABSTRACT

The disclosure presents processes to receive at least one set of ultra-deep resistivity data, and at least one additional set of measurements. The set of measurements can be resistivity data or other sensor measurements, for example, nuclear, magnetic resonance, seismic, acoustic, temperature, or pressure. The set of measurements can be data for which a relationship between the formation values and the formation porosity or fluid saturation exists. For example, acoustic or seismic compressional velocity, shear velocity, density or a ratio thereof such as acoustic impedance, compressional wave (vp)/shear wave (vs) velocity ratio, or other relationships. The processes can identify rock physics forward models to utilize as well as respective constitutive equations. Various inversion algorithms can be applied to the resistivity data and set of measurements to generate an inversion output. The inversion output can be utilized to determine subterranean formation characteristics, such as porosity, density, or fluid saturation.

24 Claims, 13 Drawing Sheets

(51) Int. Cl.
*E21B 44/02* (2006.01)
*E21B 49/00* (2006.01)

(56) References Cited

U.S. PATENT DOCUMENTS

| | | | | |
|---|---|---|---|---|
| 10,261,215 B2 * | 4/2019 | Miotti | ............... | G01V 11/002 |
| 10,451,765 B2 | 10/2019 | Wessling et al. | | |
| 10,788,598 B2 * | 9/2020 | Johansen | ............... | G06F 30/20 |
| 2009/0150124 A1 * | 6/2009 | Wilt | ............... | G01V 99/00 |
| | | | | 703/1 |
| 2009/0204327 A1 * | 8/2009 | Lu | ............... | G01V 11/00 |
| | | | | 702/7 |
| 2012/0011927 A1 | 1/2012 | Badri et al. | | |
| 2012/0109603 A1 | 5/2012 | Li et al. | | |
| 2014/0297187 A1 * | 10/2014 | Miotti | ............... | G01V 11/002 |
| | | | | 702/13 |
| 2015/0362623 A1 * | 12/2015 | Miotti | ............... | G01V 11/00 |
| | | | | 702/14 |
| 2016/0230548 A1 | 8/2016 | Gzara et al. | | |
| 2018/0058211 A1 * | 3/2018 | Liang | ............... | E21B 44/00 |
| 2021/0103068 A1 * | 4/2021 | Nasser | ............... | G01V 1/42 |
| 2021/0293139 A1 | 9/2021 | Kharaa et al. | | |
| 2022/0090481 A1 * | 3/2022 | Aljedaani | ............... | G06N 3/006 |

FOREIGN PATENT DOCUMENTS

| | | | | |
|---|---|---|---|---|
| EP | 2981848 B1 * | 5/2020 | ............... | G01V 11/002 |
| WO | WO-2017188933 A1 * | 11/2017 | ............... | G01V 3/20 |
| WO | WO-2018106257 A1 * | 6/2018 | ............... | E21B 49/00 |

OTHER PUBLICATIONS

Dell'Aversana, et al.; "Joint inversion of rock properties from sonic, resistivity and density well-log measurements"; Geophysical Prospecting; European Association of Geoscientists & Engineers; Jul. 2011; 12 pgs.

Zhang, et al.; "Crosswell electromagnetic survey: An effective approach for reservoir-scale saturation mapping"; SEG International Exposition and 87th Annual Meeting; 2017; 5 pgs.

Mishra, et al.; "Waterflood Surveillance by Calibrating Streamline-Based Simulation with Crosswell Electromagnetic Data"; IPTC-19286-MS; International Petroleum Technology Conference; Mar. 26-28, 2019; 10 pgs.

Miotti, et al.; "Meeting the Reservoir Characterization Challenges with Petrophysical Joint Inversion"; International Exposition and 87th Annual Meeting; Aug. 2017; 6 pgs.

Mishra, et al.; "Developing a Methodology for Improved Reservoir Management: A Journey from Characterization to Simulation and Back"; SPE-195486-MS; Society of Petroleum Engineers; EAGE Conference and Exhibition; Jun. 3-6, 2019; 7 pgs.

Arata, et al.; "Look Ahead Geosteering via Real Time Integration of Logging While Drilling Measurements with Surface Seismic"; SPE-187203-MS; Society of Petroleum Engineers; SPE Annual Technical Conference and Exhibition; Oct. 9-11, 2017; 12 pgs.

Antonsen, et al.; "Geosterring in Complex Mature Fields Through Integration of 3D Multi-Scale LWD-Data, Geomodels, Surface, and Time-Lapse Seismic"; SPWLA 59th Annual Logging Symposium; Jun. 2-6, 2018; 16 pgs.

Miotti, et al.; "A new petrophysical joint inversion wordflow: Advancing on reservoir's characterization challenges"; Interpretation, vol. 6, No. 3; Aug. 2018; 7 pgs.

* cited by examiner

RESERVOIR PROPERTIES DERIVED USING ULTRA-DEEP RESISTIVITY INVERSION DATA

TECHNICAL FIELD

This application is directed, in general, to deriving reservoir properties from ultra-deep resistivity inversion data and, more specifically, to using ultra-deep resistivity data combined with other sensor data to generate the reservoir properties.

BACKGROUND

When developing a borehole, such as performing drilling operations, data can be collected downhole. The data can be resistivity data, such as from an ultra-deep resistivity tool or other sensor data. Being able to analyze the collected data to provide improved directions, with higher confidence, to a geo-steering system or other borehole operations would be beneficial.

SUMMARY

In one aspect, a method is disclosed. In one embodiment, the method includes (1) receiving input parameters, a set of resistivity data, and sensor measurements of a subterranean formation at a location, downhole the borehole, wherein a drilling operation is in progress in the borehole, and at least one measurement in the set of resistivity data is collected from an ultra-deep resistivity tool, (2) determining a prior rock physics forward model (RPFM), and identifying constitutive equations to be used with the RPFM, (3) applying an inversion algorithm, using a resistivity analyzer, to the set of resistivity data and the sensor measurements, using the RPFM and the input parameters, and generating an inversion output from an output of the inversion algorithm, and (4) generating results using the inversion output, wherein the results include one or more of a porosity parameter, a water saturation parameter, or a hydrocarbon saturation parameter.

In a second aspect, a system is disclosed. In one embodiment, the system includes (1) an ultra-deep resistivity tool, capable of collecting resistivity measurements from a subterranean formation and communicate the resistivity measurements, wherein the ultra-deep resistivity tool is positioned at a location, downhole a borehole, (2) a data transceiver, capable of receiving input parameters, sets of resistivity data, and sensor measurements of the subterranean formation at the location, wherein the sets of resistivity data includes at least the resistivity measurements, and a drilling operation is in progress, and (3) a resistivity processor, capable of communicating with the data transceiver, determining a RPFM, identifying constitutive equations to be used with the RPFM, applying an inversion algorithm to the sets of resistivity data and the sensor measurements using the RPFM and input parameters to generate an inversion output, and generating results using the inversion output, wherein the results include one or more of a porosity parameter, a water saturation parameter, or a hydrocarbon saturation parameter In a third aspect, a computer program product having a series of operating instructions stored on a non-transitory computer-readable medium that directs a data processing apparatus when executed thereby to perform operations to apply an inversion algorithm to resistivity data collected downhole a borehole is disclosed. In one embodiment, the operations include (1) receiving input parameters, a set of resistivity data, and sensor measurements of a subterranean formation at a location, downhole the borehole, wherein a drilling operation is in progress in the borehole, and at least one measurement in the set of resistivity data is collected from an ultra-deep resistivity tool, (2) determining a prior RPFM, and identifying constitutive equations to be used with the RPFM, (3) applying an inversion algorithm, using a resistivity analyzer, to the set of resistivity data and the sensor measurements, using the RPFM and the input parameters, and generating an inversion output from an output of the inversion algorithm, and (4) generating results using the inversion output, wherein the results include one or more of a porosity parameter, a water saturation parameter, or a hydrocarbon saturation parameter.

BRIEF DESCRIPTION

Reference is now made to the following descriptions taken in conjunction with the accompanying drawings, in which.

DETAILED DESCRIPTION

Figure 1:
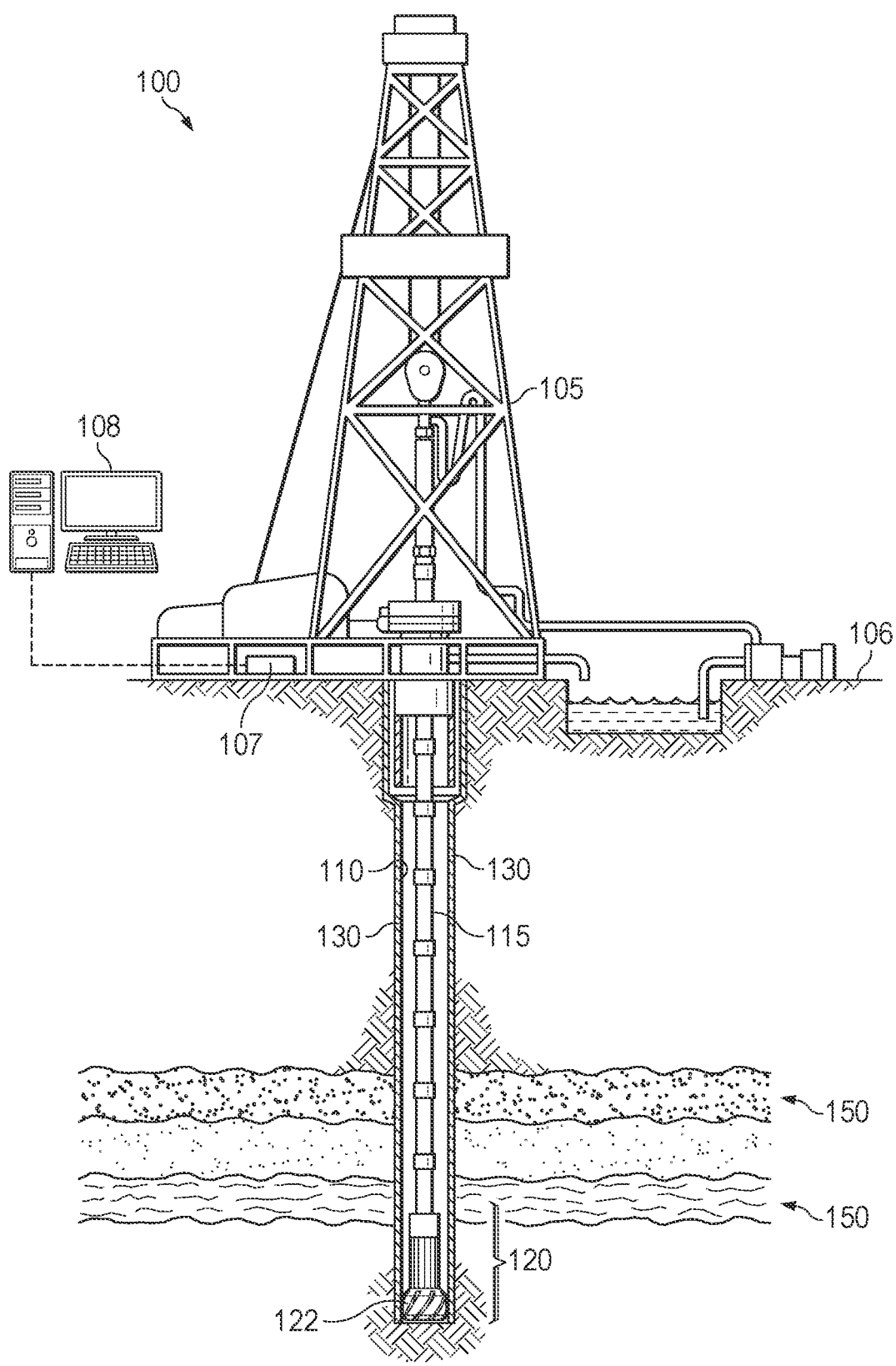
FIG. 1 is an illustration of a diagram of an example drilling system.

Developing a borehole, such as for scientific or hydrocarbon production purposes, can utilize data collected during operations, such as drilling operations. Other operations can be measuring while drilling (MWD), logging while drilling (LWD), seismic while drilling (SWD), and other types of borehole operations. Various types of sensors and tools can be utilized to collect the data, such as magnetic resonance sensors, resistivity sensors, acoustic sensors, nuclear sensors, temperature sensors, pressure sensors, seismic sensors, and other types of sensors. The data can be utilized by various borehole systems. For example, a geo-steering system for a drilling assembly can utilize the data to determine future steering directions to the drill bit, and to place the borehole in a desired direction or toward a predetermined target location, i.e., geo-steering systems.

One type of sensor that can be utilized is an ultra-deep resistivity tool that can be employed to collect resistivity measurements, where the measurements can be used to produce analysis, using images or data algorithms, of the resistivity distribution of the surrounding rock formation, i.e., the subterranean formation, along a vertical plane or a three dimensional (3D) volume. For example, the measurements can be inverted to produce images of the resistivity distribution of the surrounding rock formation along a vertical plane or a three dimensional volume. The resistivity analysis can be used to detect fluids and discriminate among fluid types surrounding the borehole, for example, distinguishing between the presence of conductive water or resistive hydrocarbons in the pore space of the subterranean formation.

Geo-steering geologists can use the resistivity analysis to make interpretations of stratigraphic boundaries and formation properties. The interpretation of zones characterized by high formation resistivity can be ambiguously interpreted in cases where measurements are affected by other formation rock properties, such as density and porosity. These properties can change within the reservoir as result of the depositional environment, compaction, fracturing, or re-mineralization.

If a zone is intersected by a bottom hole assembly (BHA), the initial interpretation of the ultra-deep resistivity data can be verified by measuring the density and porosity of the subterranean formation from petrophysical logs. If the borehole is steered away from the zone, it can be difficult to determine correlating data to confirm the interpretation. For example, in Chalk reservoirs, a high resistivity zone identified by the ultra-deep resistivity inversion can be equally interpreted to be the response of a high-density compacted layer, or a high-porosity hydrocarbon saturated zone.

In geo-steering operations, hard-compacted layers can have negative effect on the drilling and MWD tool performance, and even impact the optimization of the borehole completion design. The hard-compacted layers should be avoided or drilled with a favorable entry angle to avoid BHA tool failures and avoid difficulties in running the borehole completion because of dog leg severities. Steering the trajectory of the borehole away too early can result in by-passing or reducing the borehole pay zone if the high resistivity zone proves to be a hydrocarbon saturated productive formation, as represented by a hydrocarbon saturation parameter.

Calibrated petrophysical constitutive equations and empirical relationships are routinely utilized to analyze well logs acquired by wireline services, MWD, or LWD. The spatial distribution of the resulting output parameters is limited by the depth of investigation of the logs. In joint inversion schemes, the integration of multiple geophysical measurements and the determination of reservoir cross-properties have been proposed. The applications have been considered for limited acquisition scenarios such as wireline well logs, surface seismic and controlled source electromagnetic (CSEM) measurements, cross-well electromagnetic (EM) measurements, and seismic tomography. These acquisition methods cannot be directly utilized for real-time geo-steering decisions.

Joint inversion workflows of geophysical data benefit from acquisition of large scale two dimensional (2D) and 3D seismic surveys and CSEM surveys. The scale of these surveys can be large compared with the zone of interest and the methods have limited resolution to detect the target reservoir parameters. Workflows to estimate property distributions deeper in the reservoir benefits from data acquired simultaneously in multiple wells, for example, in applications combining cross-well seismic and EM surveys where the inter well distance can be up to one kilometer. Cross-well EM survey measurements can be sensitive to metal elements and may require a non-metal casing to improve the confidence level in the collected measurements.

Conventional joint inversion workflows used for down-hole data logs can be applicable to measurements that are available after the borehole is drilled and the range of measurements is limited to a few feet into the subterranean formation, such as from sensors and tools deployed in wireline operations. Data log acquisition (survey logs, such as using MWD, LWD, or SWD) and the combination of petrophysical measurements in the same borehole is not mentioned in the conventional processes. A process to overcome these deficiencies would be beneficial. Integration of surface measurements and deep resistivity logging has been proposed, while the joint cross-property inversion applied to real-time or near real-time data for geo-steering is part of this disclosure.

This disclosure presents processes to integrate the product output of an ultra-deep resistivity measurement inversion. For example, using a two or three dimensional representation that describes the distribution of resistivities in a formation. In some aspects, the integration can utilize deep-resistivity measurements, including ultra-deep resistivity measurements and other sensor measurements, with an inversion analysis to generate indicators of various rock properties or characteristics while drilling through a subterranean formation. The measurements include at least one measurement from a deep resistivity tool in real-time or near real-time, and at least one additional measurement from the deep resistivity tool or another sensor, to obtain formation parameters during drilling operations. In some aspects, a joint cross-property inversion of logging data in real-time or near real-time can be utilized for geo-steering. In some aspects, an ultra-deep resistivity 2D inversion process can be utilized as the inversion algorithm. In some aspects, an ultra-deep resistivity 3D inversion process can be utilized as the inversion algorithm. In some aspects, survey logs can be utilized to calibrate the set of constitutive equations.

In some aspects, these indicators can be analyzed or visualized as spatial distribution maps of attributes associated to reservoir properties such as porosity, density, or fluid saturations. In some aspects, attribute correlations can be used to reduce the uncertainty in the interpretation of favorable or unfavorable reservoir properties while drilling and geo-steering a borehole.

The processes receive at least one set of data while a drilling operation is in progress. More than one, e.g., multiple sets of data, can be received. The sets of data can be used in the inversion workflow. Each set of data can include one or more measurements of the subterranean formation received from the deep resistivity tools and other sensors. In some aspects, the measurements can be acquired by tools from the same BHA. Other measurement data can be inferred from offset borehole information, from seismic surveys, or from a calibrated reservoir model.

The processes can address a challenge of operating in low reservoir quality regions or depleted reservoirs. Boreholes drilled to identify bypassed hydrocarbon-bearing zones can encounter complex formations including high-density heterogeneous zones that have a similar response to EM survey or logging sensors as compared to high quality reservoir zones. In some aspects, the disclosed processes can be used to interpret formation zones whose properties cannot be inferred by one set of measurements, such as resistivity or seismic velocity. Such zones can be detected ahead of the drill bit and can potentially reduce the uncertainties when optimizing drilling decisions in these reservoir zones.

The processes can have the following steps: (1) Collect of at least one set of measurements in an initial section of the borehole, and then calibrating (using the set of measurements) a rock physics forward model (RPFM) that will be used in other analysis steps. In some aspects, the RPFM can be a set of RPFM that can represent a theoretical relation or an empirical relation. The set of RPFM can be determined by a choice of set parameters and a set of input measurement data. (2) Prepare data for the inversion process using the deep resistivity analysis, and one or more of an acoustic velocity model from sonic logs, a density distribution from density logs, or the RPFM. The RPFM can include a selection of RPFM relationships, for example, a clean formation can use a simple averaging relationship between the measurements data and porosity or fluid content. A shaly formation can include more complex relationships that account for the clay content impact to data measurements. (3) Determine reservoir parameters in the borehole section of interest by applying a joint inversion algorithm to the prepared data. These processes can provide results in real-time, near real-time, or in post processing by geo-steering operation systems.

In some aspects, multiple deep reservoir measurements obtained by drilling operation tools, such as MWD or LWD tools, can be collected in one borehole where additional measurement boreholes are not present or not used. In some aspects, the calibration of the constitutive equations for the RPFM can be used to create distribution maps of input variables, such as formation water conductivity parameters and rock physics parameters.

Data and models describing the cross-property relationships can be used as the input to the numerical inversion workflow. The output of the workflow can be combinations of reservoir rock properties such as porosity and fluid saturation indicating the water fraction and the hydrocarbon fraction. In general, from each measurement alone it may not be possible to uniquely identify porosity and fluid saturation using these relations. For example, using geophysical properties such as compressional velocity, electrical conductivity, and density, attempting to use each of these properties individually to estimate reservoir porosity or water saturation (Sw) can lead to uncertainty. Compressional velocity at a given porosity can fit any value of Sw. Conductivity can fit multiple combinations of Sw and porosity. Density, for a small change in porosity, can fit a large range of Sw.

By combining a set of constitutive laws, it is possible to obtain cross-parameter relations and to link conductivity and velocity, due to the common variable dependence. To resolve the porosity and saturation properties of the reservoir rock sample a joint inversion of the set of measurements can be used. In operations, a combination of near field measurements can be obtained in real time or near real-time and include estimations of density, porosity, formation slowness, or shale content. For geo-steering, additional measurements and look-ahead measurements can be integrated in the same system.

Table 1 summarizes various measurement types that that can be used to satisfy the at least one deep resistivity measurement and other measurement that is used for the disclosed processes. In some aspects, during borehole construction, LWD measurements, or other survey logging, can be taken while drilling the landing section where the formations are intercepted. The measurements can encompass a significant vertical section of the borehole including several formations and the reservoir underneath.

TABLE 1

Examples of measurement parameters used as input parameters

| Data Input | Measurements |
| --- | --- |
| Compressional velocity | Sonic LWD |
|  | Sonic Offset Wells |
|  | Surface seismic |
|  | VSP |
|  | Seismic While Drilling |
| Conductivity | LWD Resistivity |
|  | MWD Ultra-deep Resistivity Inversion |
| Density | Density LWD |
|  | Density Offset Wells |

The petrophysical data collected can be distributed into the reservoir by upscaling and by following interpreted structural boundaries. Following the construction of a geological model, density and sonic velocity measurements can be obtained by extrapolation along the full reservoir section. If the borehole lands deeper and the reservoir section is drilled by building the trajectory angle up into the reservoir, then these parameters can be propagated along the borehole to update the additional measurements needed for the workflow. This can also apply when the borehole is drilled down with an angle higher than 90 degrees in a deeper reservoir section, where the structural setting is well constrained, and the dipping geological sequences have been intersected by the borehole landing section.

In some aspects, the needed set of measurements and the necessary input data may not be available. For example, when data is needed from reservoir depths not intercepted when drilling the landing section. The additional measurements can be provided by integrating other sources of information. Table 2 list various sources to obtain the input data in the reservoir. Some of the data sources can be obtained from a sensor of the BHA, while other data sources can be obtained from sensors located elsewhere, such as at a surface location, a data center or a database, a cloud environment, or other locations within the borehole or proximate boreholes.

TABLE 2

Examples of alternate sources input data

| LWD logs | MWD deep resistivity inversion | Borehole logs/Offset boreholes | SWD logs |
| --- | --- | --- | --- |
| Density | 2D resistivity | Sonic DTC | Surface seismic |
| Neutron porosity | 3D resistivity |  | P velocity |
| Resistivity |  |  | Vertical seismic profile (VSP) |
| Gamma ray |  |  |  |
| Sonic compressional wave slowness (DTC) |  |  |  |

In some aspects, the data from other sources can be acquired from borehole logs or other sources (for example, surface seismic, ocean bottom systems, or borehole seismic surveys), and the data can utilize different scales, for example, ranging from cores to seismic. For example, compressional velocity can be imported from a 3D surface seismic survey, from a high-resolution downhole survey such as a vertical seismic profile (VSP) or a look ahead VSP, or a borehole sonic tool. In some aspects, parameters can be obtained from a geostatistical reservoir model or by interpolation of offset wells. In some aspects, measurements acquired at a high resolution can be upscaled, and near borehole measurements can be corrected for the shallow depth of investigation.

In some aspects, various combinations of input data can be utilized from one BHA or from a BHA and other sensors. Table 3 lists alternative input data combinations that can be utilized with the disclosed processes.

TABLE 3

Examples of various combinations of input data

| Measurements from a BHA | First set of data: LWD sonic P velocity and density | Second set of data: 2D or 3D deep resistivity inversions |
|---|---|---|
| Measurements from Offset boreholes and other surveys | First set of data: (at least one of the following) Offset boreholes sonic P velocity and density P velocity from seismic sources (such as one or more of surface, VSP, look ahead VSP, or SWD) | Second set of data: 2D or 3D deep resistivity inversions |

In some aspects, the visualized perspectives, such as the 2D and 3D ultra-deep resistivity imaging can be represented by data where no visual display is rendered and the analysis is applied to the data that is used to generate the imaging. These aspects can allow for complex geological scenarios to be analyzed, enabling an improved time to make geosteering decisions, thereby reducing non-productive time and avoiding sidetracking the borehole development.

Turning now to the figures, FIG. 1 is an illustration of a diagram of an example drilling system 100, for example, a LWD system, a MWD system, a SWD system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a BHA. Downhole tools 120 can include a resistivity tool or an ultra-deep resistivity tool. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving acoustic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as barrier between subterranean formation 150 and the fluids and material internal to borehole 110, as well as drill string 115. The resistivity tool or ultra-deep resistivity tool, i.e., resistivity tools, can collect resistivity data relating to the subterranean formation where the resistivity tools are currently positioned. In some aspects, a resistivity analyzer (e.g., a resistivity processor) can utilize the resistivity data to generate analysis, or one or more view perspectives, of the borehole and surrounding subterranean formations. In some aspects, the resistivity analyzer can combine other data measurements, such as from sensors located as part of the BHA or located elsewhere, such as at another location within the borehole, proximate boreholes, a surface location, models, or a distant location, such as a data center or cloud environment.

In some aspects, the resistivity analyzer can communicate the collected data or the analysis to another system, such as computer system 108 or well site controller 107 where the resistivity data can be filtered and analyzed. In some aspects, computing system 108 can be the resistivity analyzer and can receive the resistivity data from one or more of the resistivity tools. In some aspects, well site controller 107 can be the resistivity analyzer and can receive the resistivity data from one or more of the resistivity tools. In some aspects, the resistivity analyzer can be partially included with well site controller 107 and partially located with computing system 108.

Figure 2:
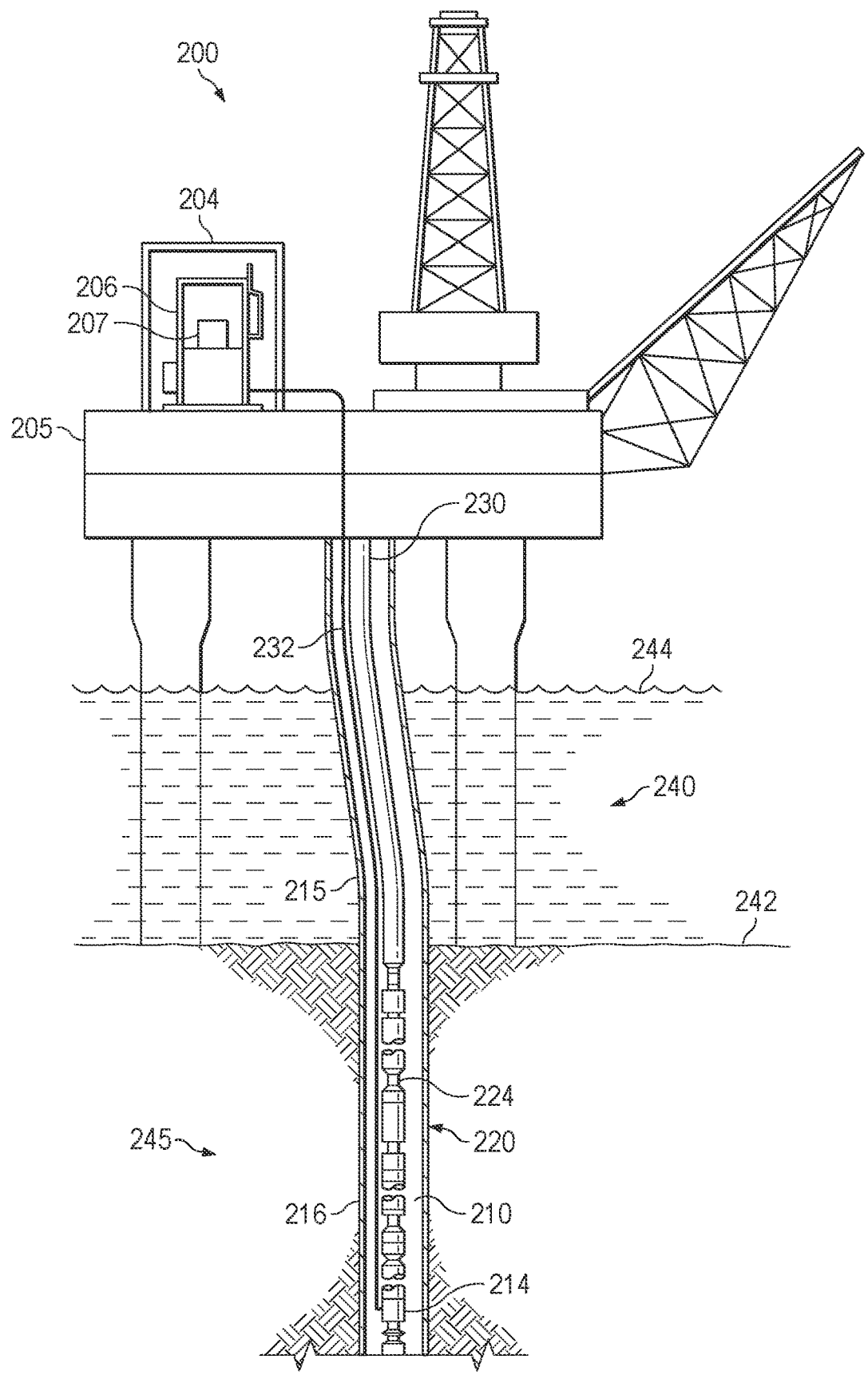
FIG. 2 is an illustration of a diagram of an example offshore system.

FIG. 2 is an illustration of a diagram of an example offshore system 200 with an electric submersible pump (ESP) assembly 220. ESP assembly 220 is placed downhole in a borehole 210 below a body of water 240, such as an ocean or sea. Borehole 210, protected by casing, screens, or other structures, is surrounded by subterranean formation 245. ESP assembly 220 can be used for onshore operations. ESP assembly 220 includes a well controller 207 (for example, to act as a speed and communications controller of ESP assembly 220), an ESP motor 214, and an ESP pump 224.

Well controller 207 is placed in a cabinet 206 inside a control room 204 on an offshore platform 205, such as an oil rig, above water surface 244. Well controller 207 is configured to adjust the operations of ESP motor 214 to improve well productivity. In the illustrated aspect, ESP motor 214 is a two-pole, three-phase squirrel cage induction motor that operates to turn ESP pump 224. ESP motor 214 is located near the bottom of ESP assembly 220, just above downhole sensors within borehole 210. A power/communication cable 230 extends from well controller 207 to ESP motor 214. A fluid pipe 232 fluidly couples equipment located on offshore platform 205 and ESP pump 224.

In some aspects, ESP pump 224 can be a horizontal surface pump, a progressive cavity pump, a subsurface compressor system, or an electric submersible progressive cavity pump. A motor seal section and intake section may extend between ESP motor 214 and ESP pump 224. A riser 215 separates ESP assembly 220 from water 240 until sub-surface 242 is encountered, and a casing 216 can separate borehole 210 from subterranean formation 245 at and below sub-surface 242. Perforations in casing 216 can allow the fluid of interest from subterranean formation 245 to enter borehole 210.

ESP assembly 220 can include a localization system, such as a resistivity tool or an ultra-deep resistivity tool, i.e., resistivity tools. In some aspects, ESP assembly 220 can include a resistivity analyzer to analyze the collected resistivity data. The analyzed data, e.g., results, can be communicated to one or more other systems, such as well controller 207. In some aspects, the collected resistivity data can be transmitted to another system, such as well controller 207. Well controller 207 can be a resistivity analyzer or a resistivity analyzer controller. In some aspects, the resistivity analyzer or the resistivity analyzer controller can be partially in well controller 207, partially in another computing system, or various combinations thereof. The results of the resistivity analyzer or resistivity analyzer controller can be used to generate one or more characteristics or parameters of the borehole and the surrounding subterranean formation.

FIG. 1 depicts onshore operations. Those skilled in the art will understand that the disclosure is equally well suited for use in offshore operations, such as shown in FIG. 2. FIGS. 1-2 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 3:
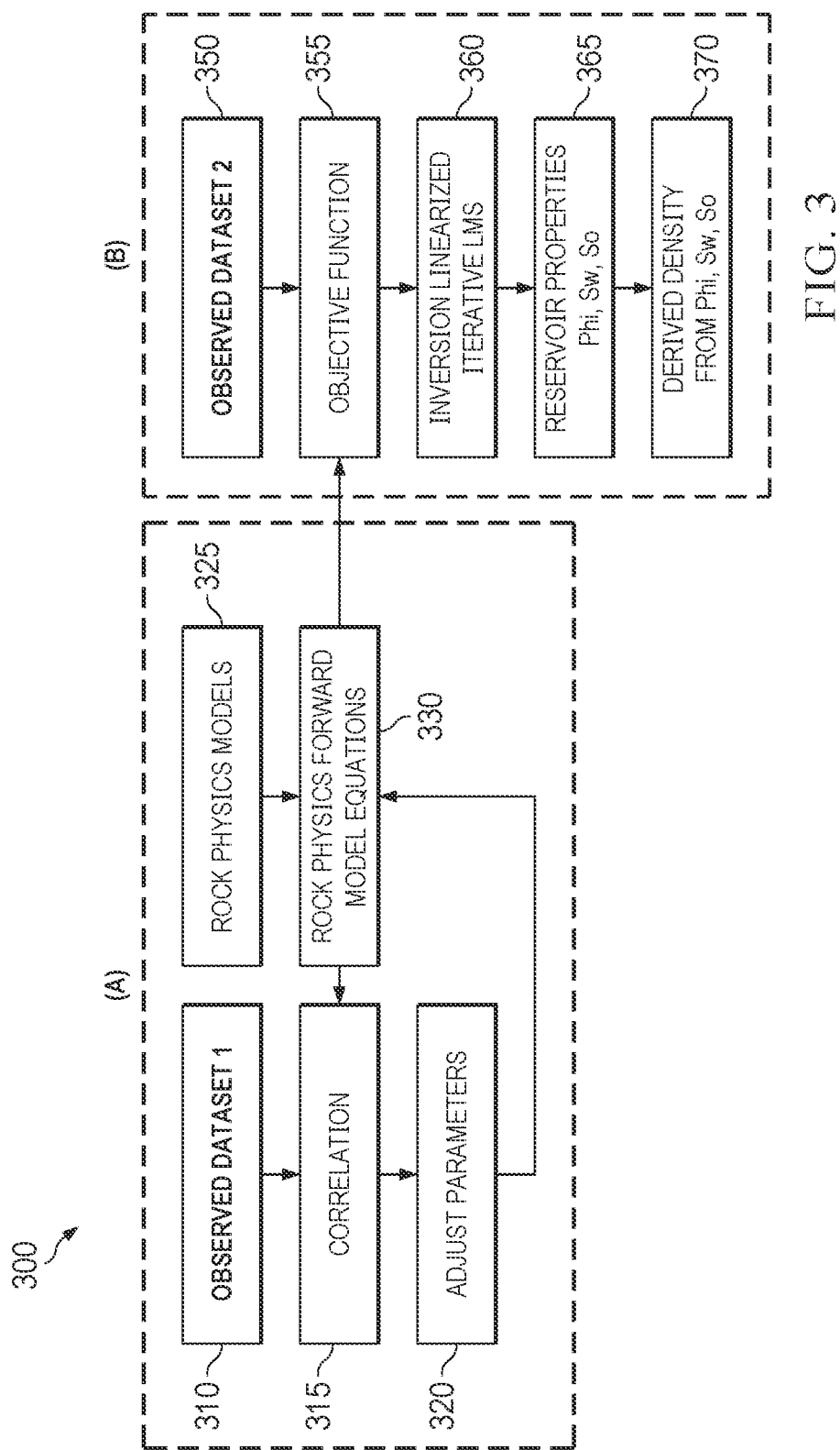
FIG. 3 is an illustration of a flow diagram of an example workflow demonstrating nested calibration.

FIG. 3 is an illustration of a flow diagram of an example workflow 300 demonstrating a general inversion algorithm. Workflow 300 demonstrates that the calibration step (e.g., step 615 of FIG. 6A) can be nested using and inversion loop to allow the recalibration of the RPFM if the inversion does not meet a convergence threshold.

In a step 310, a first set of observations (observed dataset 1), for example, from an uphole section of the borehole such as a landing or vertical section, can be analyzed to calibrate the RPFM parameters. In a step 325, one or more RPFM can be identified to be used in the processes. In a step 330, each RPFM can utilize one or more equations. In a step 315, the RPFM and the first set of observations can be used to correlate the parameters. In a step 320, the correlation can be used to determine calibration parameters, which can be applied in step 330 to update the RPFM. In various aspects, various calibration methods can be utilized, for example, one or more machine learning based relations, trial-and-error parameters, or a selection utilizing a high correlation grade.

In a step 350, a second set of observations (observed dataset 2) for example, can be collected in the reservoir section where most of the reservoir geo-steering decisions are made. In a step 355, the inversion algorithm can minimize an objective function that is a measure of the difference between observation and forward modeled physical parameters. In a step 360, the inversion algorithm can be applied, such as using a linearized iterative least mean square (LMS) algorithm.

In a step 365, a minimum of two equations can solve for porosity parameters and fluid saturation parameters utilizing acoustic parameters and ultra-deep resistivity parameters. In some aspects, workflow density can be used as a third relationship. In a step 370, a derived density parameter can be determined from the inversion output by back calculating the value from porosity parameters and water saturation parameters.

Figure 4:
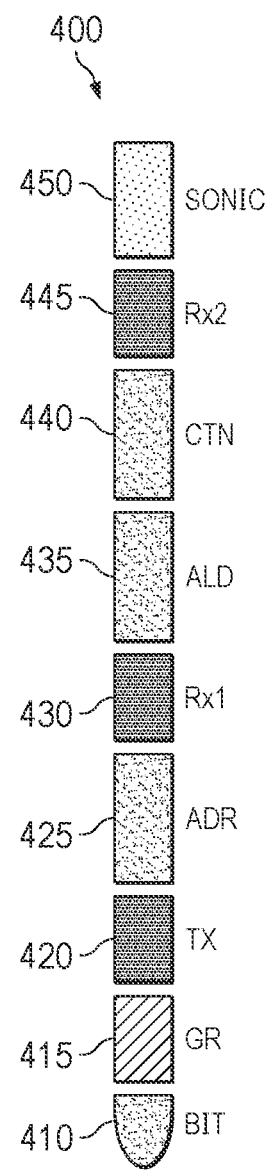
FIG. 4 is an illustration of a diagram of an example bottom hole assembly (BHA)

FIG. 4 is an illustration of a diagram of an example BHA 400. BHA 400 demonstrates a schematic configuration of a BHA that can be used for the described data acquisition. The ultra-deep resistivity components can be one or more transmitters and one or more receiver modules, for example, one transmitter and two receiver modules. Sensors of BHA 400 can be positioned along the BHA at separation distances suitable to measure resistivity deep into the reservoir. Other sensor types can be interspaced as part of BHA 400 to obtain other measurements of the subterranean formation and borehole fluids. The non-resistivity type sensors can be utilized in the disclosed processes to provide other measurements for the algorithms, for example, in a SWD system, deep look sonic measurements can be collected.

BHA 400 has a drill bit assembly 410 located at the downhole end of BHA 400. At the next uphole location, BHA 400 has a gamma ray sensor 415. Next is an ultra-deep EM transmitter 420. Next is an azimuthal deep resistivity sensor 425. The next uphole location is a first ultra-deep EM receiver 430. Next is an azimuthal density sensor 435. Next is a neutron porosity sensor 440. Next is a second ultra-deep EM receiver 445. Positioned at the uphole end of BHA 400 is a sonic sensor 450, such as a sonic assembly transmitter and receivers. The position of the various sensors of BHA 400 can vary. Other tools or sensors can be part of BHA 400 and located at various positions along BHA 400, such as seismic sensors. Not all of the sensors described here need to be part of BHA 400, for example sonic sensor 450 can be absent form BHA 400.

Figure 5:
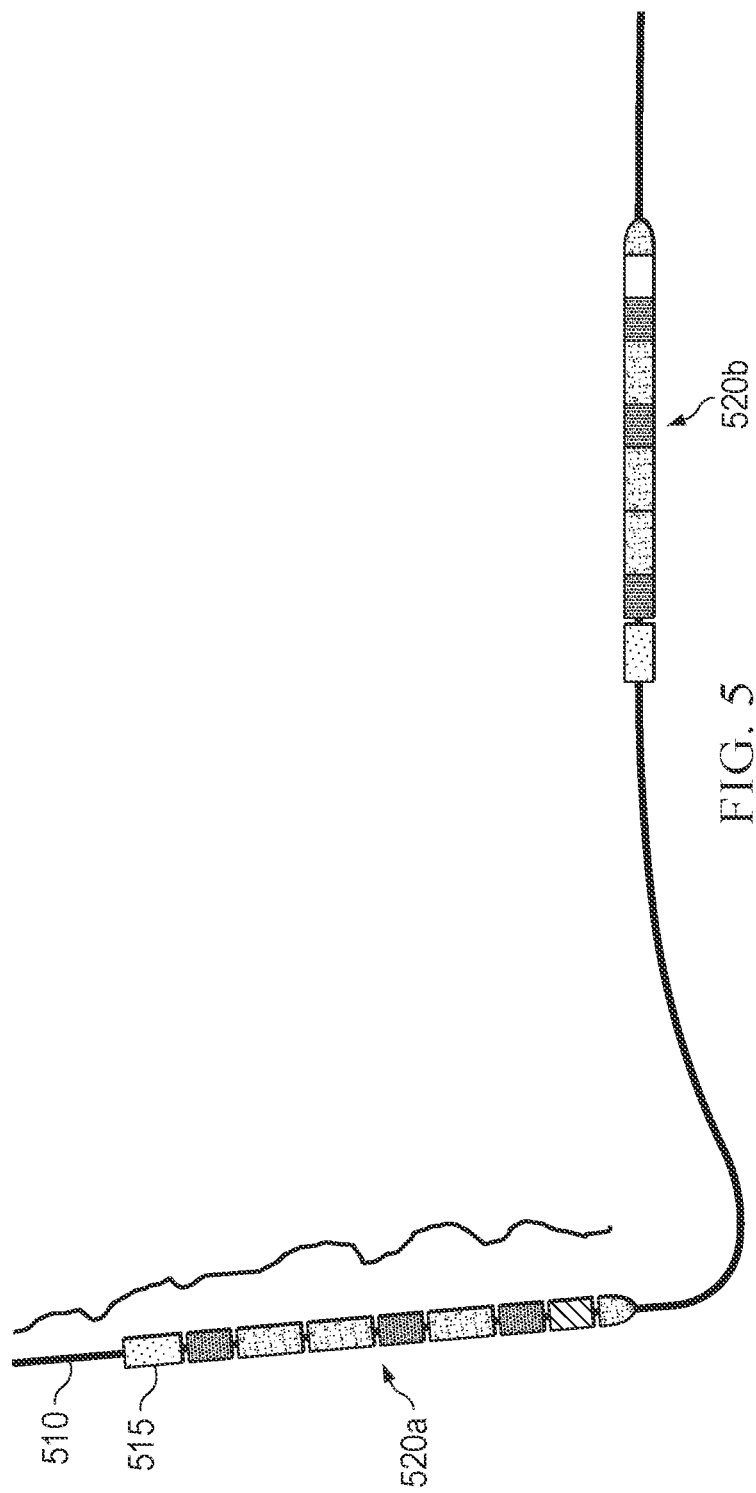
FIG. 5 is an illustration of a diagram of an example BHA position within a borehole.

FIG. 5 is an illustration of a diagram of an example BHA position 500 within a borehole. BHA position 500 shows two BHA positions that can be utilized to obtain the initial model calibration and the reservoir characterization, i.e., subterranean formation and borehole fluid characteristics and parameters. BHA position 500 shows a borehole 510 with an uphole end that is approximately vertical, and a downhole end that is approximately horizontal. Inserted into borehole 510 is a BHA 515. BHA 515 is shown at a first position 520a along the approximate vertical portion of borehole 510, and at a second position 520b along the approximate horizontal portion of borehole 510.

At first position 520a, the initial model calibration can be completed. For example, the RPFM can be calibrated using neutron porosity measurements, deep resistivity measurements, density measurements, or P velocity measurements. At second position 520b, the disclosed inversion algorithms can be utilized while drilling is in progress. The inversion algorithms can be generated, for example, ultra-deep resistivity images, borehole logs with structural elements, reservoir interpolations, or seismic data.

Figure 6A:
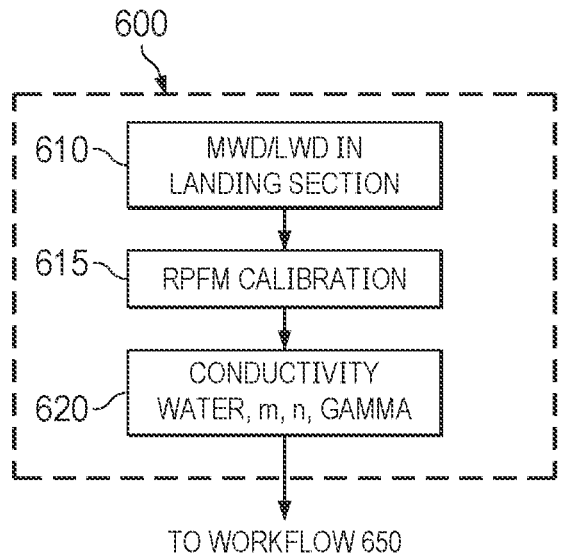
FIG. 6A is an illustration of a flow diagram of an example workflow to generate rock physics forward model (RPFM)
Figure 6B:
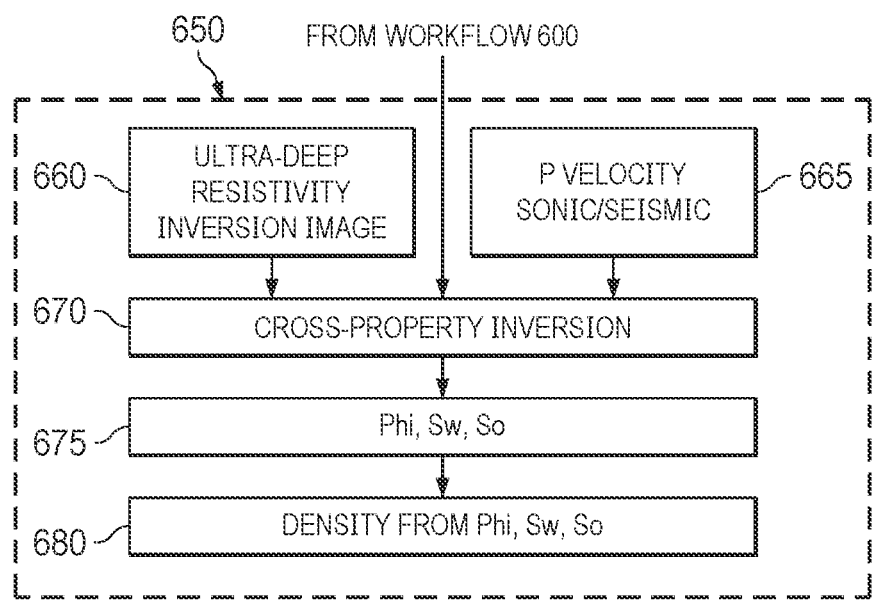
FIG. 6B is an illustration of a flow diagram of an example workflow to generate modeling calculations using RPFM.

FIG. 6A is an illustration of a flow diagram of an example workflow 600 to generate RPFM. In some aspects, the disclosed processes can be separated into two main steps, where workflow 600 is the first main step and a workflow 650 of FIG. 6B is a second main step. Workflow 600 can be a calibration process that can be applied prior to the inversion algorithms, such as when a BHA is at first position 520a. The output of workflow 600 can be a set of parameters to optimize the RPFM.

Workflow 600 has a step 610 to receive measurements and parameters from sensor measurements, for example collected MWD, SWD, or LWD measurements. These measurements can be typically collected in the landing section, though they can be collected at various positions with the borehole where workflow 600 (e.g., calibration) is being performed. In a step 615 calibration procedure can include the selection or identification of the constitutive equations to utilize for the RPFM and then the calibration of the needed parameters for the RPFM.

As part of the calibration process of step 615, assumptions can be made of the initial parameters of averaged material properties for the reservoir. For example, (1) matrix solid material parameters, such as bulk modulus parameters, conductivity parameters, or density parameters, (2) fluid parameters, such as bulk modulus parameters, conductivity parameters, or density parameters, or (3) reservoir water salinity parameters, temperature parameters, or electrical conductivity parameters at insitu conditions. The RPFM describing the electrical response as a function of the combination of material parameters can be selected. The RPFM parameters describing the material mixing laws (such as exponents m and n for Archie, m, p for Glover, gamma for CRIM, and other conventional mixing laws) can be adjusted to an initial fit of the data.

In a step 620, other parameters, (for example, the formation water conductivity or the mixing law variables m, n, and gamma), can be adjusted as these parameters can change significantly from the measured formation resistivity. One or more RPFMs suitable to describe acoustic or seismic measurements, and other collected measurements, can be selected and employed. Calibration of the parameters for each of the selected models can be performed.

Workflow 600 can utilize various algorithms, such as a data-driven machine learning approach. Workflow 600 can be performed before the inversion algorithms are applied, or workflow 600 can be nested inside inversion iteration loops, such as when multiple calibrations becomes necessary. In some aspects, a distribution of the optimized parameters can be provided as a result when utilizing parameters distributed in the reservoir, such as provided by ultra-deep resistivity inversions. The results can provide interpretable information of the reservoir. For example, the water conductivity distribution can be resolved during the calibration procedure by utilizing a matching of the data observations.

FIG. 6B is an illustration of a flow diagram of an example workflow 650 to generate the inversion results. Workflow 650 demonstrates the use of cross-property inversion algorithms. Workflow 600 can be used to determine the elements required to complete the joint inversion of ultra-deep measurements in workflow 650. The input data to workflow 650 can be the results from workflow 600, such as the calibrated RPFM, ultra-deep resistivity parameters (as determined in a step 660), velocity parameters, or density parameters (as determined in a step 665). Workflow 650 utilizes the calibrated RPFM for the multiple data inversion scheme to estimate data by forward modeling the physical measurements. The difference of the data estimation and the observed measurements can be minimized by the inversion algorithms. Workflow 650 shows the calculations that can be made when the BHA is in a second position, such as at second position 520b of FIG. 5.

In a step 670, various conventional inversion algorithms can be utilized, such as the linearized iterative least squares inversion with regularization terms, the multi-parameter global search, or the statistical inversion algorithms. In a step 675, the selected inversion algorithm can provide a combination of model parameters that can fit the data. Such model parameters can represent reservoir properties (e.g., characteristics) related to different fluids present in the rock (i.e., subterranean formation) or the total fraction of pore space occupied by fluids. The model parameters can be the rock matrix porosity (i.e., Phi, $\phi$) and the saturation fraction of fluids, such as water (i.e., Sw), oil, gas, or other hydrocarbon (i.e., So).

In some aspects, the measurements collected can be an approximation or relative physical values, for example, the conductivity derived from ultra-deep resistivity inversion or acoustic impedance ratios. In these aspects, the resulting parameters can be interpreted as indicators rather than as absolute values for the porosity parameters and fluid saturation parameters. In some aspects, using the calibrated RPFM and the calculated parameters, some of the input geophysical measurements that were initially derived by interpolation can be qualified and determined with greater specificity and higher confidence in their accuracy. For example, in a step 680, density distributions can be calculated once the inverted porosity and water saturation parameters are determined.

Figure 7A:
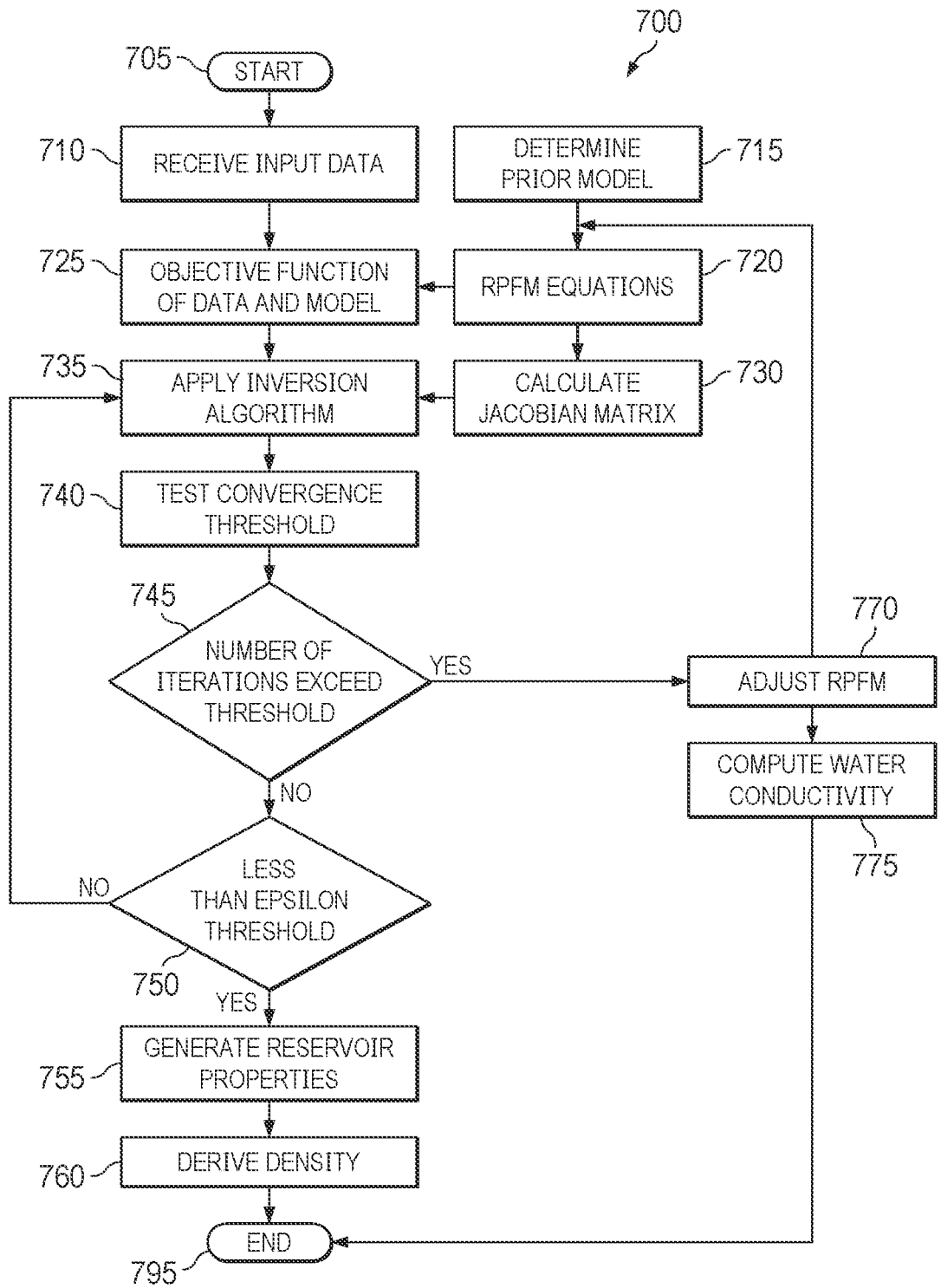
FIG. 7A is an illustration of a flow diagram of an example method demonstrating nested calibration.

FIG. 7A is an illustration of a flow diagram of an example method 700 to demonstrate nested calibration. Method 700 utilizes the steps as described in FIGS. 3, 6A, and 6B, such as how the linearized inversion using cross-property relations is implemented. Method 700 can be performed on a computing system, for example, resistivity analyzer system 800 of FIG. 8 or resistivity analyzer controller 900 of FIG. 9. The computing system can be a well site controller, a geo-steering system, a resistivity system, a reservoir controller, a data center, a cloud environment, a server, a laptop, a mobile device, smartphone, PDA, or other computing system capable of receiving the resistivity data, input parameters, and capable of communicating with other computing systems. Method 700 can be encapsulated in software code or in hardware, for example, an application, code library, dynamic link library, module, function, RAM, ROM, and other software and hardware implementations. The software can be stored in a file, database, or other computing system storage mechanism. For example, at least of portion of the steps of method 700 can correspond to an algorithm represented by a series of operating instructions stored on a non-transitory computer readable medium. Method 700 can be partially implemented in software and partially in hardware. Method 700 can perform the steps for the described processes, for example, calibrating a RPFM and generating one or more result parameters, such as porosity or fluid saturation parameters.

Method 700 starts at a step 705 and proceeds to a step 710. In step 710, observed data is received as input data. The input data can be geophysical measurements such as velocity parameters, density parameters, or conductivity parameters. Other collected sensor measurements can be utilized as well. One or more of the input data can be provided by a BHA. Method 700 can proceed to a step 715. Step 715 can be done prior to step 710, in parallel to step 710, overlapping step 710, or after step 710. A starting RPFM model can be determined using an initial set of porosity and saturation parameters. The initial porosity parameters and the initial fluid saturation parameters can be provided as input data, such as from a user, a data model, a data source, previously conducted methods from the current borehole or other boreholes in the reservoir, previously conducted methods from other boreholes not in the current reservoir, or from a machine learning system.

From step 715, method 700 proceeds to a step 720 where the RPFM constitutive equations utilized for forward modeling each of the geophysical measurements can be selected. The selection process can utilize estimated data or approximations.

From step 710 or step 720, method 700 proceeds to a step 725. In step 725, the objective functions are composed of two terms, (1) the difference between the data used in step 710 and step 720, and (2) the difference between the prior RPFM (i.e., the original model) and the updated RPFM, e.g., data residuals and model residuals. Covariance matrices can be determined where one set represents the data covariance and a second set represents the RPFM covariance. Data covariance is the sum of a matrix representing the uncertainty in the modelled data expressed as a difference between estimated and observed data, and a matrix representing the standard deviation error estimated for each measurement. The model covariance is the sum of a matrix representing conditions of model parameters physical bounds, such as the inverse correlation between Sw and So, and the boundary limits of porosity parameters and fluid saturation parameters, and the prior RPFM covariance estimated from model residuals after each iteration as a difference between the updated RPFM and the prior RPFM.

Proceeding from step 720, method 700 proceeds to a step 730, where a Jacobian matrix is calculated analytically or numerically, depending on the formulation of the RPFM equations, from the partial derivatives of the measurements respect to each model parameter from the equations determined in step 720. For example, the modeling relation can be obtained from a digital rock representation.

From step 725 and step 730, method 700 proceeds to a step 735. In step 735, an inversion algorithm is applied to the input data using the RPFM. Step 735 is performed by a resistivity analyzer, such as resistivity analyzer 820 or resistivity analyzer controller 900. The selected inversion algorithm can be specified by a user input or defaulted to an algorithm, such as a linearized iterative least mean square algorithm. Since step 735 can be iterative, an exit condition can be specified, such as a convergence threshold or a number of iterations threshold. In aspects, where step 735 is part of an iteration loop, each iteration at step 735 can utilize the same or different inversion algorithm. In some aspects, a machine learning process can be utilized to determine an appropriate inversion algorithm to apply to improve the convergence of the inversion processing for each iteration.

Proceeding to a step 740, a threshold or criteria can be utilized to determine an exit condition of the inversion iterations. Step 740 is performed by a resistivity analyzer, such as resistivity analyzer 820 or resistivity analyzer controller 900. In a decision step 745, the iterative process ends when the number of iterations performed exceeds the number of iterations threshold. If the inversion iterations have not yet converged and the number of iterations threshold is not satisfied, i.e., the resultant is "Yes", method 700 proceeds to a step 770 to attempt to modify the RPFM parameters to identify a better fit to the input data. If the resultant is "No", method 700 proceeds to a decision step 750.

In decision step 750, a determination is made if the inversion process does not converge and requires recalibration of the parameters used for the RPFM. For example, when the root mean square (RMS) data residual is less than the epsilon threshold or RMS model updates is less than the epsilon threshold, then either the computed data RMS residuals or the model RMS residuals have fallen below the epsilon threshold. Both residual functions can result in a similar convergence. If the resultant is "No", then method 700 proceeds to step 735 and the iterative process continues. If the resultant is "Yes", then method 700 proceeds to a step 755, meaning that the inversion iterative process has sufficiently converged.

In step 755, the results can be generated, such as Phi parameters, Sw parameters, or So parameters. The results can be communicated to one or more other systems. Step 755 is performed by a resistivity analyzer, such as resistivity analyzer 820 or resistivity analyzer controller 900. In a step 760, the results can be utilized to recalculate the derived density parameter. The derived density parameter can be communicated to one or more other systems. Step 760 is performed by a resistivity analyzer, such as resistivity analyzer 820 or resistivity analyzer controller 900.

In step 770, the RPFM can be adjusted. The fluid conductivity can be modified. The RPFM can be adjusted using a predefined range of parameters. The joint iterative inversion can be applied. The adjusted RPFM can then be used in further inversion iterations when method 700 proceeds to step 720. In serial, parallel, or overlapping processes, method 700 can proceed to a step 775 where water conductivity parameters can be computed. Mapping fluid conductivities can be processed by using the revised parameters for each inverted point. Method 700 can proceed to a step 795 after step 760 or step 775. Method 700 ends at step 795.

Figure 7B:
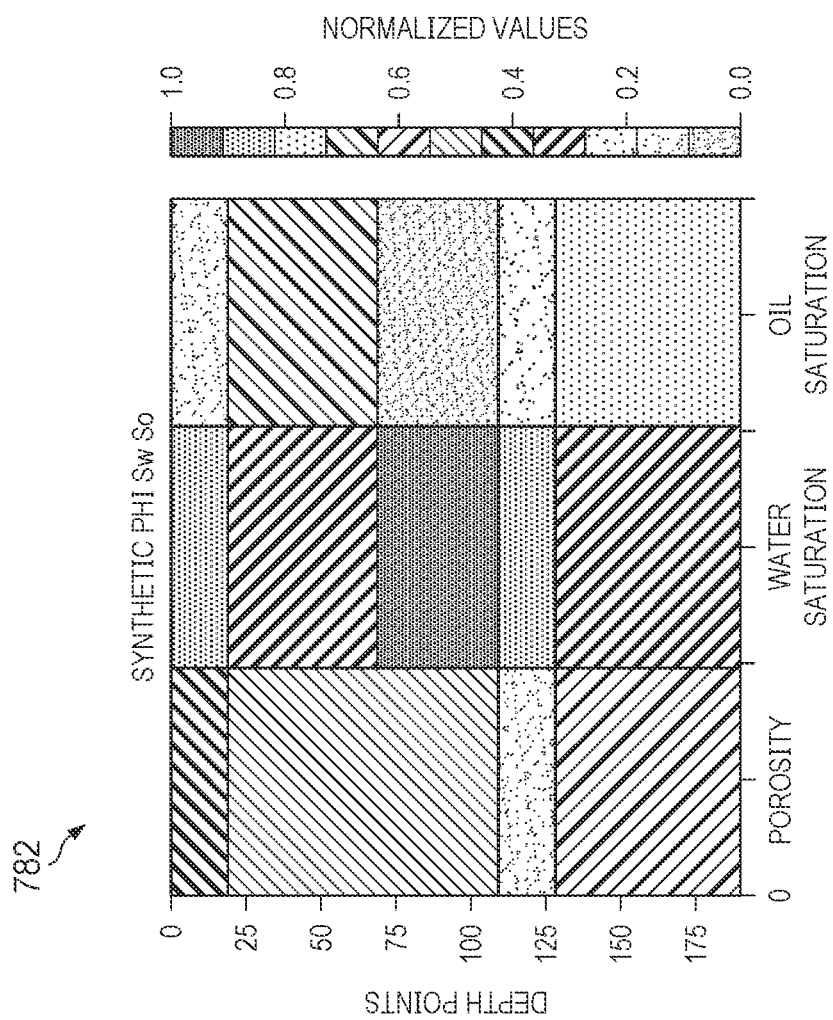
FIG. 7B is an illustration of a diagram of an example set of material properties for each constructed layer for demonstrating the method described in FIG. 7A.

To demonstrate method 700, a model with five layers having various reservoir properties can be synthesized, such as listed in Table 4 (see FIG. 7B, synthetic input data 780).

TABLE 4

Example synthesized data for demonstration of the workflow

| | |
|---|---|
| Synthetic model, 5 layers | Layer 1: shale/overburden |
| | Layer 2: oil saturated |
| | Layer 3: water flooded |
| | Layer 4: compacted/high density |
| | Layer 5: oil saturated |
| Starting model | Homogeneous layers |
| | Matrix from material composition |
| | Fluid properties |
| Forward modeling | P velocity, Raymer modifications |
| | Conductivity: CRIM |
| | Density: Mavko material average |

Figure 7C:
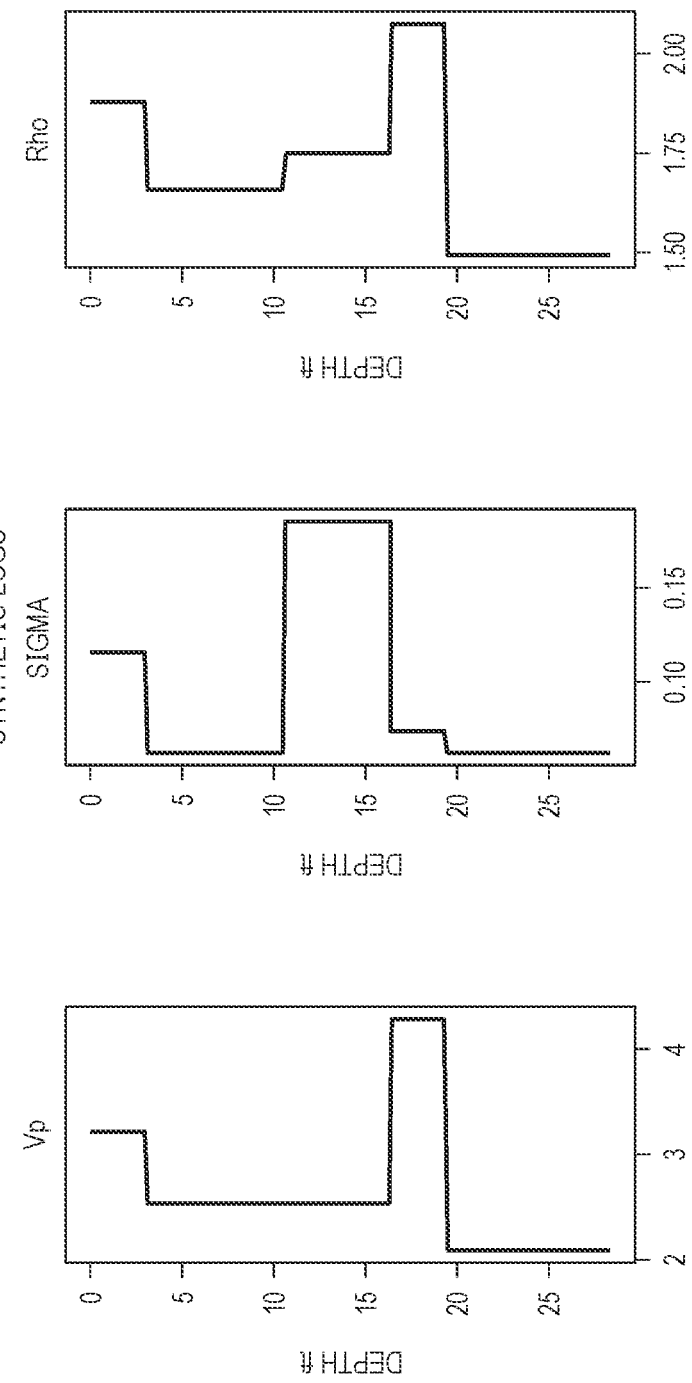
FIG. 7C is an illustration of a diagram of an example forward modeling synthetic data describing physical properties of the model building on FIG. 7B.
Figure 7D:
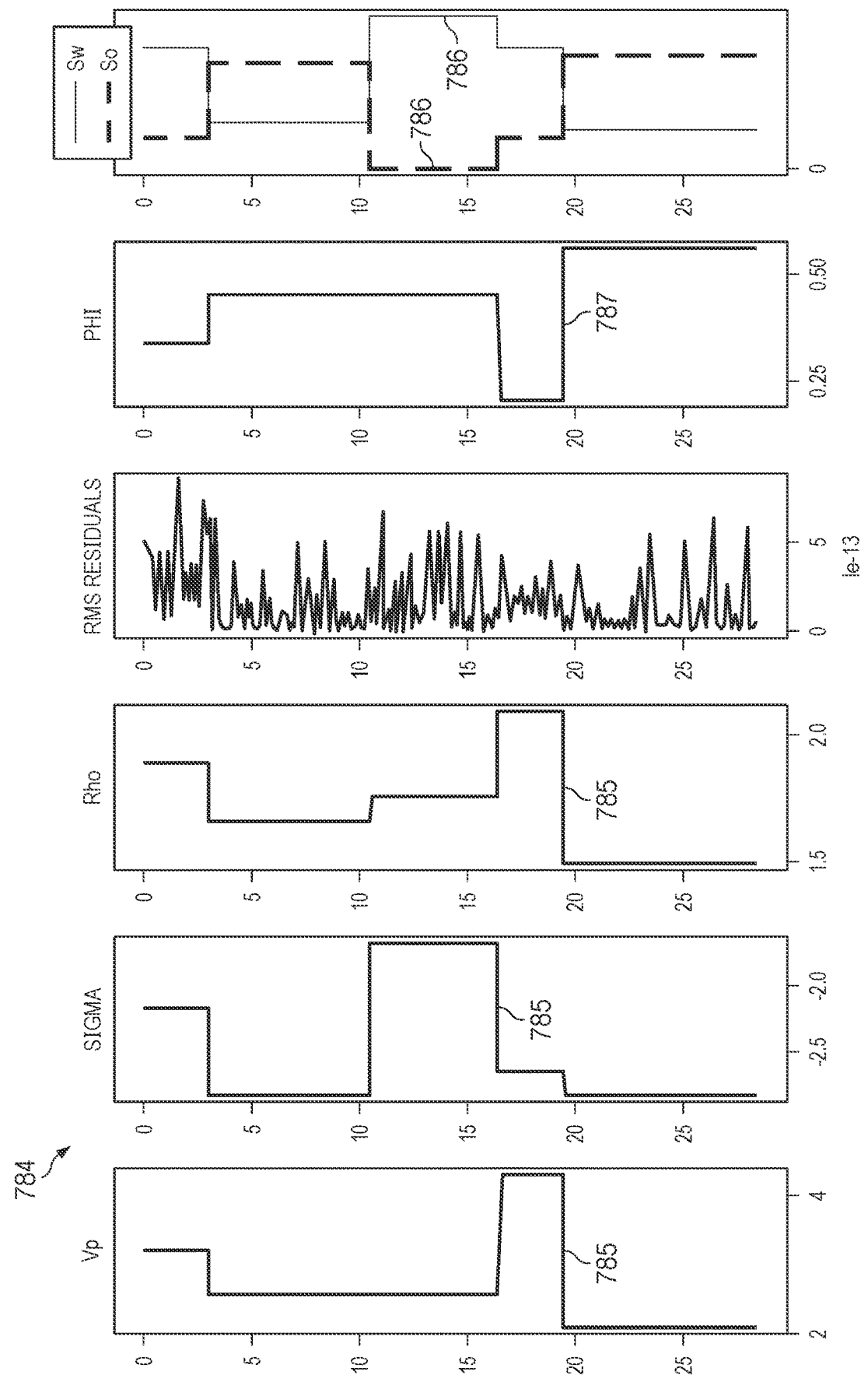
FIG. 7D is an illustration of a diagram of an example results of the linearized iterative inversion building on FIG. 7C.

Utilizing RPFM equations, a synthetic geophysical dataset can be generated to determine the p-velocity, the density, or the conductivity of the five layers (see FIG. 7C, synthetic log 782). The synthetic data can be inverted following the iterative inversion processes. An optimal convergence for the reservoir parameters can be obtained and the RPFM geophysical measurements using the inverted model appear to match the input observations (see FIG. 7D, results 784). Results 784 of the linearized iterative inversion are shown. Lines 785 represent the results of the physical properties modelled by using the final inverted model. Lines 786 represent the observations obtained from the true model. In this example, line 786 represents water saturation and oil saturation recovered by the inversion. A line 787 represents the recover model porosity. The same parameters for the RPFM were used. It can be observed that there is a dependence of porosity with the P-velocity structure and of the water saturation with the conductivity structure.

Figure 7E:
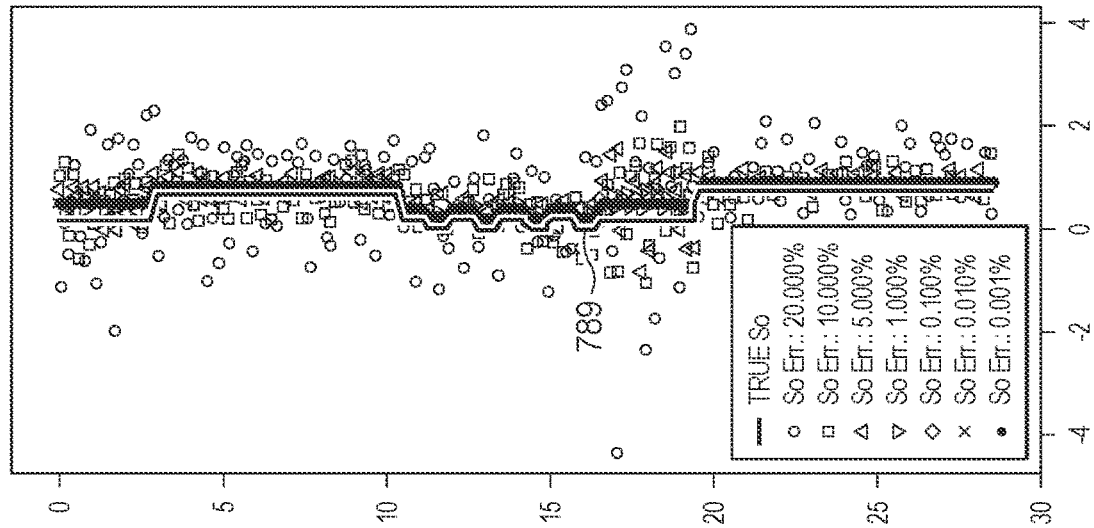
FIG. 7E is an illustration of a diagram of an example data fitting model of the results building on FIG. 7D.
Figure 7E:
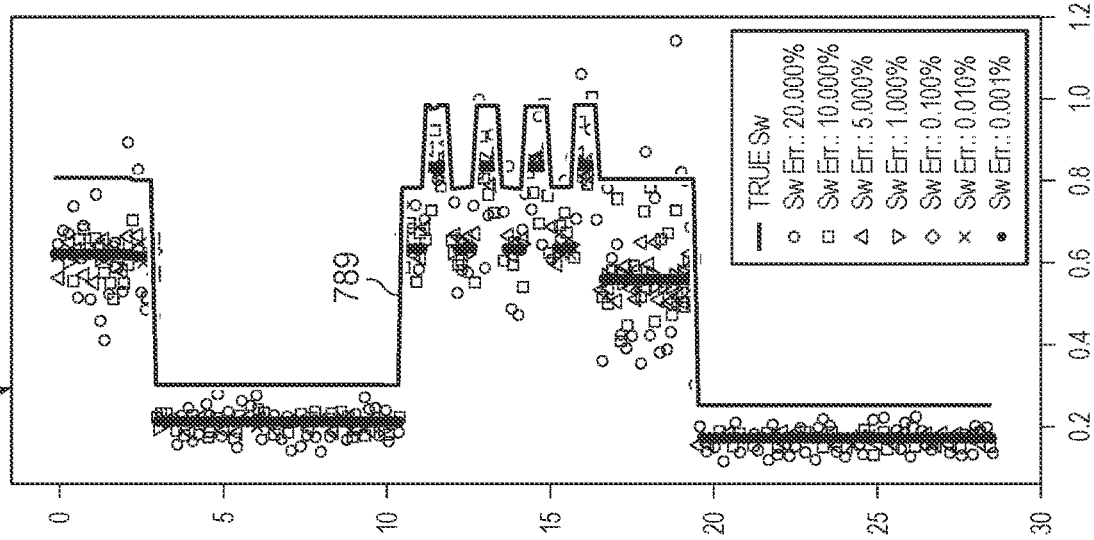
Figure 7E:
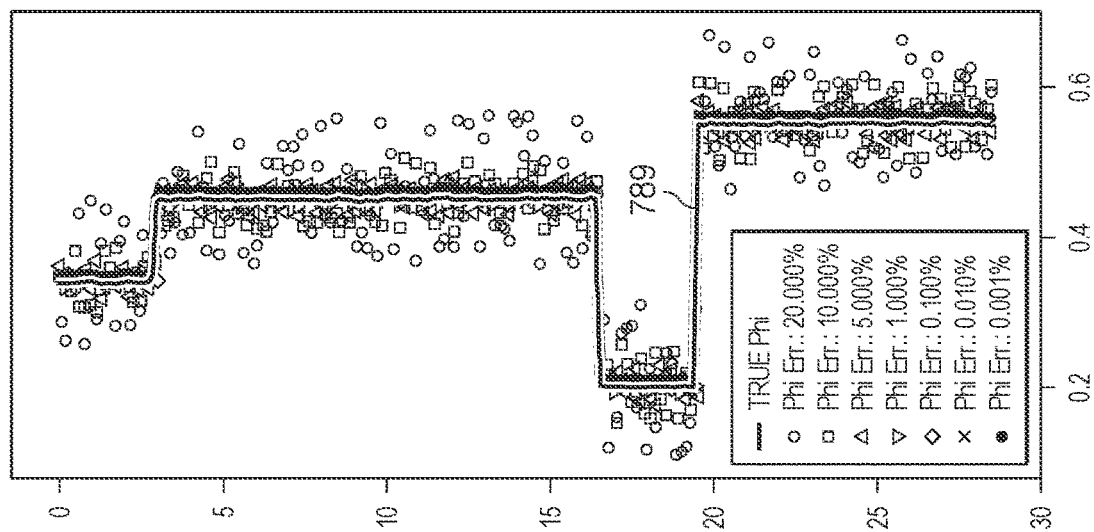

The sensitivity of the inversion can be analyzed by using different error levels to both the measurement and the model. Random noise errors can range, for example, from 0.1% to 20% of each parameter. To test sensitivity to the RPFM, the conductivity CRIM model with different values of gamma were used for the forward modeling and the inversion. The inversion assumed a gamma=1.0 for the rock physics model. Results of the analysis are shown in FIG. 7E using a data fitting model 788. The inversion results include an uncertainty distribution using the same synthetic model utilizing a gamma equal to 1.2 to model the true physical observations. Solid lines 789 shows the true data against the plotted computed results at each depth. The inverted conductivity values, see a panel 790, is skewed toward lower values when compared to the true values, shown by solid lines 789. This error can be caused by poor calibration of the RPFM modeling step, such as using an overestimated gamma value.

An equivalent (though in a different direction) skewing effect can be observed when the gamma value is underestimated, for example, when using a gamma equal to 0.8. This demonstrates the importance of the model calibration step to the success of the inversion workflow.

Figure 8:
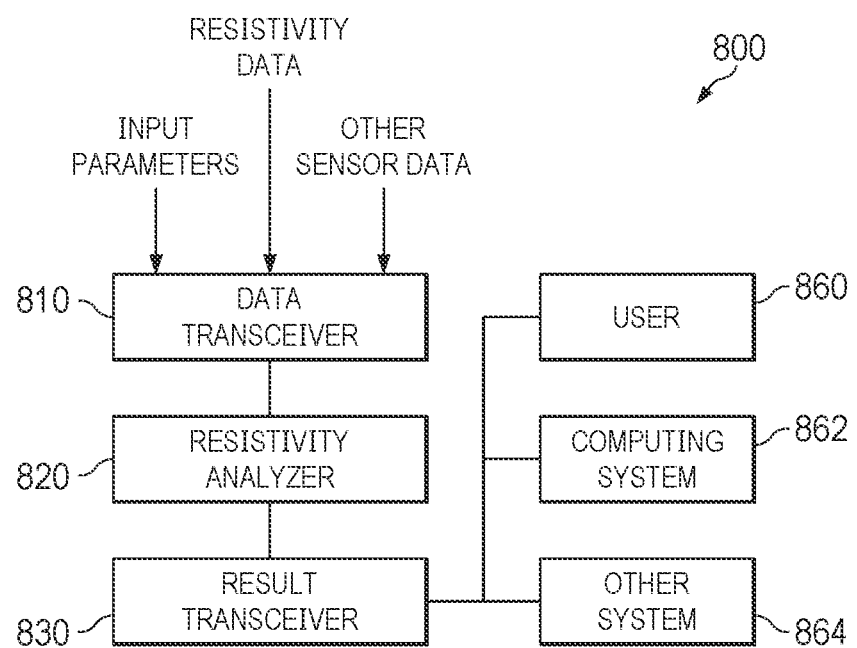
FIG. 8 is an illustration of a block diagram of an example downhole resistivity analyzer system.

FIG. 8 is an illustration of a block diagram of an example resistivity analyzer system 800, which can be implemented in one or more computing systems, for example, a data center, cloud environment, server, laptop, smartphone, tablet, and other computing systems. In some aspects, resistivity analyzer system 800 can be implemented using a resistivity analyzer controller such as resistivity analyzer controller 900 of FIG. 9. Resistivity analyzer system 800 can implement one or more methods of this disclosure, such as method 700 of FIG. 7A, or workflow 600 of FIG. 6A, workflow 650 of FIG. 6B, or workflow 300 of FIG. 3.

Resistivity analyzer system 800, or a portion thereof, can be implemented as an application, a code library, a dynamic link library, a function, a module, other software implementation, or combinations thereof. In some aspects, resistivity analyzer system 800 can be implemented in hardware, such as a ROM, a graphics processing unit, or other hardware implementation. In some aspects, resistivity analyzer system 800 can be implemented partially as a software application and partially as a hardware implementation. Resistivity analyzer system 800 is a functional view of the disclosed processes and an implementation can combine or separate the described functions in one or more software or hardware systems.

Resistivity analyzer system 800 includes a data transceiver 810, a resistivity analyzer 820, and a result transceiver 830. The results, e.g., the subterranean formation characteristics, the borehole fluid characteristics, the reservoir fluid characteristics, analysis, and interim outputs from resistivity analyzer 820 can be communicated to a data receiver, such as one or more of a user or user system 860, a computing system 862, or other processing or storage systems 864. The results can be used to determine the directions provided to a geo-steering system or used as inputs into a well site controller or other borehole system, such as a borehole operation planning system.

Data transceiver 810 can receive input parameters, such as parameters to direct the operation of the analysis implemented by resistivity analyzer 820, such as algorithms to utilize in determining a selected RPFM or inversion method, or in determining which positions of the downhole sensors should be used to perform the calibration of the RPFM. In some aspects, input parameters can include user inputs, such as to determine the inversion algorithms to utilize, a test convergence threshold, a number of iterations threshold, or other user input parameters. In some aspects, data transceiver 810 can be part of resistivity analyzer 820.

Result transceiver 830 can communicate one or more results, analysis, or interim outputs, to one or more data receivers, such as user or user system 860, computing system 862, storage system 864, e.g., a data store or database, or other related systems, whether located proximate result transceiver 830 or distant from result transceiver 830. Data transceiver 810, resistivity analyzer 820, and result transceiver 830 can be, or can include, conventional interfaces configured for transmitting and receiving data. In some aspects, resistivity analyzer 820 can be a machine learning system, such as providing a process to calibrate the RPFM using one or more input parameters, and to perform inversion analysis using one or more inversion algorithms. In some aspects, resistivity analyzer 820 can perform the inversion analysis using more than inversion algorithm and utilize machine learning to determine which result to use if the results differ.

Resistivity analyzer 820 can implement the analysis and algorithms as described herein utilizing the resistivity data, the input parameters, and other collected measurements. For example, resistivity analyzer 820 can perform the calibration of RPFM, apply the inversion algorithm to the input data using the calibrated RPFM, or to derive subterranean formation characteristics using the results of the inversion algorithm.

A memory or data storage of resistivity analyzer 820 can be configured to store the processes and algorithms for directing the operation of resistivity analyzer 820. Resistivity analyzer 820 can also include a processor that is configured to operate according to the analysis operations and algorithms disclosed herein, and an interface to communicate (transmit and receive) data.

Figure 9:
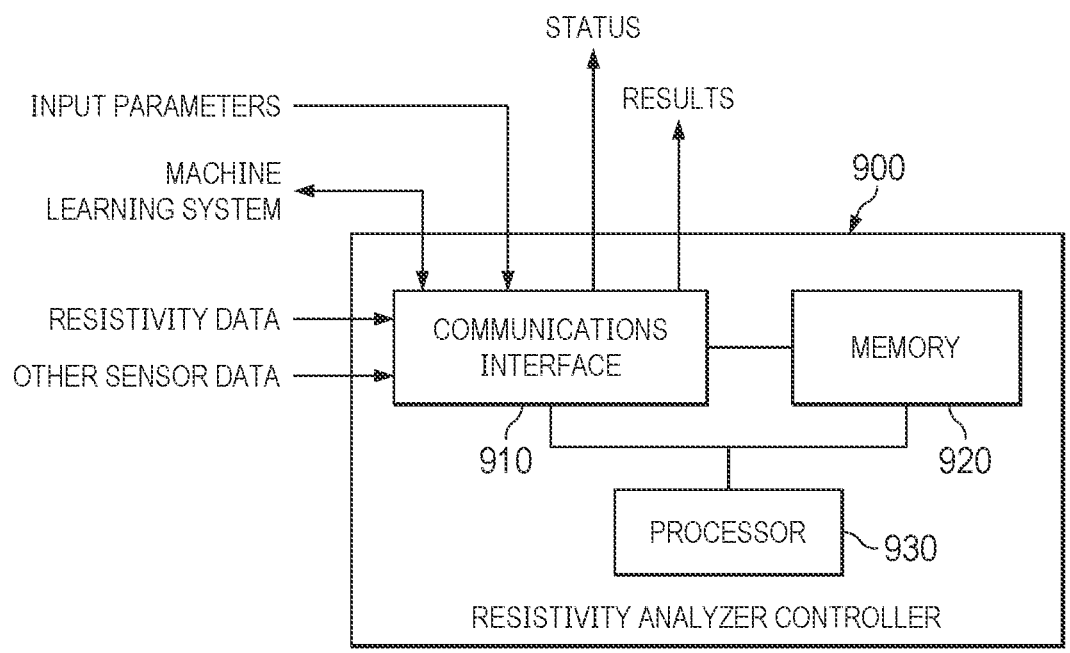
FIG. 9 is an illustration of a block diagram of an example of a resistivity analyzer controller according to the principles of the disclosure.

FIG. 9 is an illustration of a block diagram of an example of resistivity analyzer controller 900 according to the principles of the disclosure. Resistivity analyzer controller 900 can be stored on a single computer or on multiple computers. The various components of resistivity analyzer controller 900 can communicate via wireless or wired conventional connections. A portion or a whole of resistivity analyzer controller 900 can be located at one or more locations and other portions of resistivity analyzer controller 900 can be located on a computing device or devices located at a surface location. In some aspects, resistivity analyzer controller 900 can be wholly located at a surface or distant location. In some aspects, resistivity analyzer controller 900 can be part of another system, and can be integrated in a single device, such as a part of a borehole operation planning system, a well site controller, a geo-steering system, or other borehole system.

Resistivity analyzer controller 900 can be configured to perform the various functions disclosed herein including receiving input parameters, resistivity data, and other sensor measurements, and generating results from an execution of the methods and processes described herein, such as calibrating RPFM, applying inversion algorithms, deriving other subterranean formation parameters, and other results and analysis. Resistivity analyzer controller 900 includes a communications interface 910, a memory 920, and one or more processors, which are represented by processor 930.

Communications interface 910 is configured to transmit and receive data. For example, communications interface 910 can receive the input parameters, resistivity data, and other collected sensor measurements. Communications interface 910 can transmit the generated results, data from the input files, or interim outputs. In some aspects, communications interface 910 can transmit a status, such as a success or failure indicator of resistivity analyzer controller 900 regarding receiving the various inputs, transmitting the generated results, or producing the generated results.

In some aspects, communications interface 910 can receive input parameters from a machine learning system, for example, where the resistivity data is processed using one or more filters and algorithms prior to calibrating the RPFM or applying the inversion algorithm.

In some aspects, the machine learning system can be implemented by processor 930 and perform the operations as described by resistivity analyzer 820. Communications interface 910 can communicate via communication systems used in the industry. For example, wireless or wired protocols can be used. Communication interface 910 is capable of performing the operations as described for data transceiver 810 and result transceiver 830 of FIG. 8.

Memory 920 can be configured to store a series of operating instructions that direct the operation of processor 930 when initiated, including the code representing the algorithms for determining processing the collected data. Memory 920 is a non-transitory computer readable medium. Multiple types of memory can be used for data storage and memory 920 can be distributed.

Processor 930 can be configured to produce the results (e.g., calibrating the RPFM, output from the inversion algorithms, derived subterranean formation characteristic parameters, and other results), one or more interim outputs, and statuses utilizing the received inputs. Processor 930 can be configured to direct the operation of resistivity analyzer controller 900. Processor 930 includes the logic to communicate with communications interface 910 and memory 920, and perform the functions described herein. Processor 930 is capable of performing or directing the operations as described by resistivity analyzer 820 of FIG. 8.

Various figures and descriptions can demonstrate a visual display of the resistivity data and the resulting analysis of the resistivity data, such as an ultra-deep resistivity image. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the analysis of the resistivity data can occur by a downhole tool, such as a resistivity tool. In some aspects, the resistivity data or partially analyzed resistivity data can be transmitted to one or more surface computing systems, such as a well site controller, a computing system, or other processing system. The surface system or surface systems can perform the analysis and can communicate the results to one or more other systems, such as a well site controller, a well site operation planner, a geo-steering system, or another borehole system.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: communicating, using a result transceiver, the results to a borehole operation planning system, a well site controller, or a geo-steering system. Element 2: updating, utilizing the results, directions for the geo-steering system or operation plans for the borehole operation planning system. Element 3: wherein the determining the RPFM further comprises calculating a Jacobian matrix from partial derivatives of the sensor measurements with respect to each RPFM parameter from the constitutive equations. Element 4: deriving a density parameter using the inversion output and the porosity parameter and the water saturation parameter. Element 5: wherein the RPFM is a first RPFM and one or more additional RPFM are determined and used for applying the inversion algorithm. Element 6: wherein the location is a first location, the set of resistivity data is a first set of resistivity data, and the sensor measurements are a first set of sensor measurements, and a second location is used to collect a second set of resistivity data and a second set of sensor measurements, further comprising calibrating the RPFM using the second set of resistivity data and the second set of sensor measurements. Element 7: wherein the applying the inversion algorithm further comprises iterating the applying the inversion algorithm until an exit condition is satisfied, wherein the exit condition is one or more of a number of iterations threshold or a convergence threshold. Element 8: wherein the number of iterations threshold is not satisfied and further comprising adjusting the RPFM to improve a fit to the sensor measurements and the set of resistivity data, and then identifying the constitutive equations to be used with the RPFM. Element 9: computing a water conductivity parameter utilizing a calibration of the constitutive equations to create a distribution map. Element 10: wherein the inversion algorithm utilizes a two-dimensional inversion process or a three dimensional inversion process. Element 11: wherein the set of resistivity data is received from one or more ultra-deep resistivity tools located downhole the borehole. Element 12: wherein the sensor measurements is one or more of measurements collected from one or more resistivity tools, one or more acoustic sensors, one or more seismic sensors, one or more magnetic resonance sensors, one or more nuclear sensors, one or more temperature sensors, one or more pressure sensors. Element 13: wherein the sensor measurements are received from one or more of one or more of an offset borehole, one or more of a seismic survey, or one or more of a calibrated reservoir model. Element 14: a machine learning system, capable of communicating with the data transceiver and the resistivity processor, and performing a filtering of the sets of resistivity data and the sensor measurements. Element 15: a result transceiver, capable of communicating the results, interim outputs, to a user system, a data store, or a computing system. Element 16: a borehole system, capable of receiving the results, wherein the borehole system is one of a geo-steering system or a borehole operation planning system. Element 17: wherein the resistivity processor is located proximate the borehole system.

What is claimed is:

1. A method, comprising:
    receiving input parameters, a set of resistivity data, and sensor measurements of a subterranean formation at a location, downhole a borehole, wherein a seismic while drilling operation is in progress in the borehole, at least one measurement in the set of resistivity data is collected from an ultra-deep resistivity tool, and at least one sensor measurement in the sensor measurements is from a vertical seismic profile (VSP);
    determining a prior rock physics forward model (RPFM), and identifying constitutive equations to be used with the RPFM;
    applying an inversion algorithm, through at least two iterations, using a resistivity processor, to the set of resistivity data and the sensor measurements, using the RPFM and the input parameters, and generating an inversion output from an output of the inversion algorithm, wherein at least two different inversion algorithms are applied through the at least two iterations;
    generating results using the inversion output, wherein the results include one or more of a porosity parameter, a water saturation parameter, or a hydrocarbon saturation parameter; and
    directing a geo-steering system of a drilling assembly to alter a drilling path through interpretation of the porosity parameter, the water saturation parameter, or the hydrocarbon saturation parameter.

2. The method as recited in claim 1, further comprising:
    communicating, using a result transceiver, the results to a borehole operation planning system, a well site controller, or a geo-steering system.

3. The method as recited in claim 2, further comprising:
    updating, utilizing the results, directions for the geo-steering system or operation plans for the borehole operation planning system.

4. The method as recited in claim 1, wherein the determining the RPFM further comprises:
    calculating a Jacobian matrix from partial derivatives of the sensor measurements with respect to each RPFM parameter from the constitutive equations.

5. The method as recited in claim 1, further comprising:
    deriving a density parameter using the inversion output, the porosity parameter, and the water saturation parameter.

6. The method as recited in claim 1, wherein the RPFM is a first RPFM and one or more additional RPFM are determined and used for applying the inversion algorithm.

7. The method as recited in claim 1, wherein the location is a first location, the set of resistivity data is a first set of resistivity data, and the sensor measurements are a first set of sensor measurements, and a second location is used to collect a second set of resistivity data and a second set of sensor measurements, further comprising:
    calibrating the RPFM using the second set of resistivity data and the second set of sensor measurements.

8. The method as recited in claim 1, wherein the applying the inversion algorithm further comprises:
    iterating the applying the inversion algorithm until an exit condition is satisfied, wherein the exit condition is one or more of a number of iterations threshold or a convergence threshold.

9. The method as recited in claim 8, wherein the number of iterations threshold is not satisfied and further comprising:
    adjusting the RPFM to improve a fit to the sensor measurements and the set of resistivity data, and then identifying the constitutive equations to be used with the RPFM.

10. The method as recited in claim 9, further comprising:
    computing a water conductivity parameter utilizing a calibration of the constitutive equations to create a distribution map.

11. The method as recited in claim 1, wherein the inversion algorithm utilizes a two-dimensional inversion process or a three dimensional inversion process.

12. The method as recited in claim 1, wherein the set of resistivity data is received from one or more ultra-deep resistivity tools located downhole the borehole.

13. The method as recited in claim 1, wherein the sensor measurements is one or more of measurements collected from one or more resistivity tools, one or more acoustic sensors, one or more seismic sensors, one or more magnetic resonance sensors, one or more nuclear sensors, one or more temperature sensors, one or more pressure sensors.

14. The method as recited in claim 1, wherein the sensor measurements are received from at least one of one or more of an offset borehole, one or more of a seismic survey, or one or more of a calibrated reservoir model.

15. A system, comprising:
    an ultra-deep resistivity tool, capable of collecting resistivity measurements from a subterranean formation and communicate the resistivity measurements, wherein the ultra-deep resistivity tool is positioned at a location, downhole a borehole;
    a data transceiver, capable of receiving input parameters, sets of resistivity data, and sensor measurements of the subterranean formation at the location, wherein the sets of resistivity data includes at least the resistivity measurements, at least one sensor measurement in the sensor measurements is from a vertical seismic profile (VSP), and a seismic while drilling operation is in progress; and
    a resistivity processor, capable of communicating with the data transceiver, determining a rock physics forward model (RPFM), identifying constitutive equations to be used with the RPFM, applying an inversion algorithm to the sets of resistivity data and the sensor measurements, through at least two iterations, using the RPFM and input parameters to generate an inversion output, and generating results using the inversion output, wherein the results include one or more of a porosity parameter, a water saturation parameter, or a hydrocarbon saturation parameter, and where at least two different inversion algorithms are applied through the at least two iterations.

16. The system as recited in claim 15, further comprising:
a machine learning system, capable of communicating with the data transceiver and the resistivity processor, and performing a filtering of the sets of resistivity data and the sensor measurements.

17. The system as recited in claim 15, further comprising:
a result transceiver, capable of communicating the results, interim outputs, to a user system, a data store, or a computing system.

18. The system as recited in claim 15, further comprising:
a borehole system, capable of receiving the results, wherein the borehole system is one of a geo-steering system or a borehole operation planning system.

19. The system as recited in claim 18, wherein the resistivity processor is located as part of a well site controller.

20. The system as recited in claim 15, wherein the at least two different inversion algorithms are utilized at different tool positions within the borehole.

21. A non-transitory computer program product having a series of operating instructions stored on a non-transitory computer-readable medium that directs a data processing apparatus when executed thereby to perform operations to apply an inversion algorithm resistivity data collected downhole a borehole, the operations comprising:
 receiving input parameters, a set of resistivity data, and sensor measurements of a subterranean formation at a location, downhole the borehole, wherein a seismic while drilling operation is in progress in the borehole, at least one measurement in the set of resistivity data is collected from an ultra-deep resistivity tool, and at least one sensor measurement in the sensor measurements is from a vertical seismic profile (VSP);
 determining a prior rock physics forward model (RPFM), and identifying constitutive equations to be used with the RPFM;
 applying an inversion algorithm, through at least two iterations, using a resistivity analyzer, to the set of resistivity data and the sensor measurements, using the RPFM and the input parameters, and generating an inversion output from an output of the inversion algorithm, wherein at least two different inversion algorithms are applied through the at least two iterations;
 generating results using the inversion output, wherein the results include one or more of a porosity parameter, a water saturation parameter, or a hydrocarbon saturation parameter; and
 directing a geo-steering system of a drilling assembly to alter a drilling path through interpretation of the porosity parameter, the water saturation parameter, or the hydrocarbon saturation parameter.

22. The non-transitory computer program product as recited in claim 21, wherein the VSP is a look ahead VSP.

23. The non-transitory computer program product as recited in claim 21, wherein the set of resistivity data is collected from a look ahead location of the drilling assembly.

24. The non-transitory computer program product as recited in claim 21, wherein a machine learning process determines the at least two different inversion algorithms that are applied.

* * * * *